July 10, 1962 W. F. BUSSE ET AL 3,043,716
PROCESS OF BONDING POLYOLEFIN RESINS TO POLAR SOLID
SUBSTRATES, RESULTANT COATED ARTICLE AND
POLYOLEFIN COATING COMPOSITION
Filed April 14, 1958

FIG. I
PROCESS A FLOW SHEET

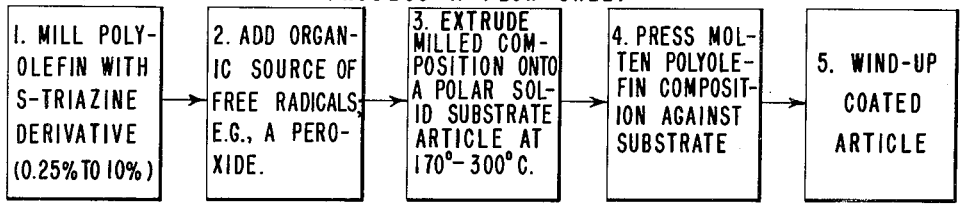

FIG. II
COATED FILM OF PROCESS A

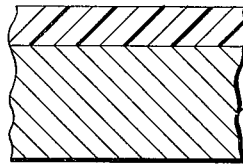

FIG. III
COATED WIRE OF PROCESS A

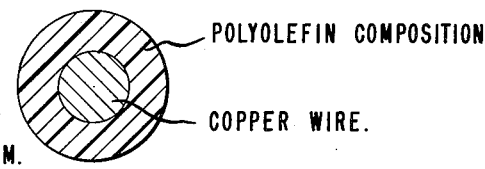

FIG. IV
PROCESS B FLOW SHEET

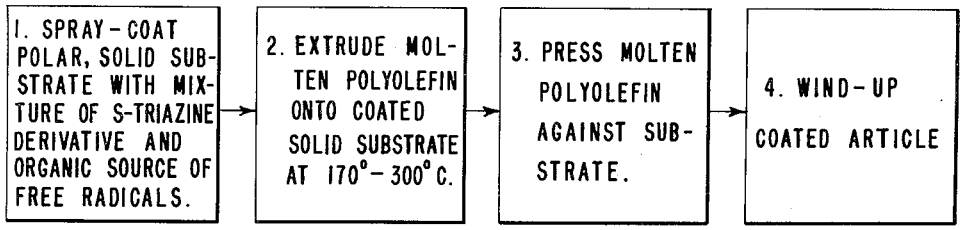

FIG. V
COATED FILM OF PROCESS B

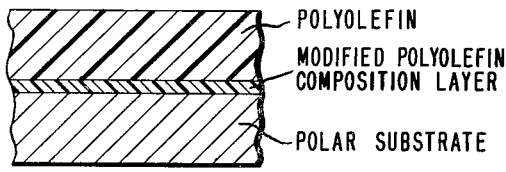

FIG. VI
COATED WIRE OF PROCESS B

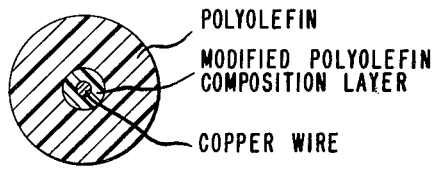

INVENTORS
WARREN FROEMMING BUSSE
GEORGE HENRY BOWERS III
JOHN BRIAN ARMITAGE

BY
ATTORNEY

United States Patent Office 3,043,716
Patented July 10, 1962

3,043,716
PROCESS OF BONDING POLYOLEFIN RESINS TO POLAR SOLID SUBSTRATES, RESULTANT COATED ARTICLE AND POLYOLEFIN COATING COMPOSITION
Warren Froemming Busse, George Henry Bowers III, and John Brian Armitage, Wilmington, Del., assignors to E. I. du Pont de Nemours and Company, Wilmington, Del., a corporation of Delaware
Filed Apr. 14, 1958, Ser. No. 728,068
19 Claims. (Cl. 117—132)

This invention is concerned with a process for preparing adherent coatings of hydrocarbon resins on solid substrates and the products obtained. More particularly this invention is concerned with a process for coating shaped solid substrates with high molecular weight polymers of 1-olefins in the presence of certain s-triazine derivatives which have been found to promote the adhesion of the polyolefins to polar materials.

It is well known that the chemical inertness and nonpolarity of hydrocarbon polymers obtained from the polymerization of 1-olefins normally prevent the formation of chemical or physical bonds between such hydrocarbon polymers and more polar materials such as metals, siliciferous materials, carbon blacks, and polar condensation polymers such as polyethylene terephthalate. Because of the excellent electrical resistance and resistance to water-vapor penetration of the polyolefin resins as well as their toughness and flexibility, it has been recognized that valuable and useful products might result if a way could be found to coat shaped articles, such as metal foils and wires and synthetic films, fabrics, and monofilaments with an adherent layer of a polyolefin resin such as polyethylene.

In the past, various oxidative treatments have applied to the surfaces of preformed polyethylene articles to render them adherent to various polar materials. Chromic acid, hydrogen peroxide, ozone, etc. have been employed for this purpose. In other cases, certain modifiers such as phosphate esters, chlorinated biphenyl, and chlorinated paraffine admixed with ammonium sulfamate have been employed to impart a degree of adhesiveness between various materials and polyethylene surfaces. More recently, as disclosed in the copending application S.N. 610,886 of W. F. Busse and J. A. Boxler, filed September 20, 1956, and issued June 10, 1958, as U.S. Patent 2,838,437, a group of olefinic carboxylic acids and their derivatives were disclosed to be effective modifiers for polyolefin resins to make them adherent to metals and to certain polar plastics such as nylon. Various obvious disadvantages such as corrosiveness and limitations as to the types of materials with which adhesiveness is obtained are inherent in all of the above methods. Thus, for instance, none of them is effective for bonding polyolefin resins to polyethylene terephthalate.

Therefore it is an object of this invention to provide an improved process for use with high molecular weight hydrocarbon polymers, particularly those obtained from the polymerization of 1-olefins, which will produce strong adhesion between such polymers and a wide variety of polar materials. More particularly it is an object of this invention to provide a process employing a new class of modifiers for use with high molecular weight polyolefins obtained by the polymerization of 1-olefins which will produce strong adhesion between such polyolefins and shaped articles made from such polar materials as metals and synthetic plastics, such as polyethylene terephthalate. Another object of this invention is to provide modified polyolefinic compositions suitable for extrusion to form adherent coatings on shaped articles. A particular object of this invention is to provide a laminated film structure comprising a film of polyethylene adhered strongly to a film of polyethylene terephthalate. Other objects and advantages of this invention will appear hereinafter.

It has now been discovered, as disclosed herein, that thermoplastic hydrocarbon resins can be caused to adhere strongly to a wide variety of solid polar materials, including metals, synthetic plastics, and siliciferous materials, by contacting the molten hydrocarbon resin with these materials under pressure in the presence of small amounts of s-triazine derivatives selected from the class consisting of polyallyl esters of cyanuric acid and polyallyl melamines.

Thermoplastic hydrocarbon resins which are high molecular weight polyolefins obtained by the polymerization of 1-olefins are particularly useful in their application because of their toughness, flexibility, excellent electrical resistance and high resistance to water-vapor penetration. The invention may be practiced with polyethylenes, both of the branched, low-density type, having densities (20°/4°), annealed, in the range of .91 to .93 and of the linear, high density type, having densities (20°/4°), annealed, in the range of .95 to .97. Equally well the invention may be practiced with copolymers of ethylene with homologous 1-olefins and with homopolymers of such higher 1-olefins. Generally superior results are obtained by the use of a hydrocarbon resin of high molecular weight having melt indexes in the range of 0.1 to about 10.

The polar, solid substrates which may be adhered to the hydrocarbon plastic may be in any desired form. Thus wires, cables, tubes, filaments, fibers, textile fabrics, films, foils, and sheets may be employed. Flow sheets of the process are set forth in FIGURES I and IV. Enlarged, cross-sectional views of coated foils and wires obtained by the process of this invention are shown in FIGURES II, III, V, and VI. This invention is also useful in obtaining improved properties in filled hydrocarbon plastics since it is necessary to have good adhesion between the plastic and the filler in order to attain maximum toughness, strength, and stiffness in filled plastics. Such fillers may be in finely divided form or in the form of mats of entangled fibers such as glass fibers.

This invention is particularly useful for the preparation of laminated films and sheets. Thus thin metal foils can be laminated to a film of polyethylene or other polyolefin by the process of this invention. Of particular interest are the laminates, which can be obtained by the use of this invention, between polyethylene terephthalate films and polyethylene, since this invention now makes it possible to obtain good adhesion between polyethylene and polyethylene terephthalate. The resulting laminated films are believed novel; the bonds between the polyethylene and the polyethylene terephthalate films have peel strength of from 1.5 to 5 pounds per inch and more, depending upon the conditions used in preparing the laminates.

The process of this invention may be carried out as indicated in FIGURE I by preparing an admixture of a s-triazine derivative of the class defined herein with the hydrocarbon plastic, and then extruding the molten mixture onto the solid substrate. Any proportion of the s-triazine in the hydrocarbon plastic between about 0.25% and about 10% by weight may be employed, but the range of from 0.5% to 5% by weight s-triazine derivative in hydrocarbon plastic is preferred. Proportions less than about 0.25% by weight generally do not produce very much improvement in adhesion, while amounts greater than about 5% by weight of the s-triazine derivative do not produce appreciably greater adhesion than can be achieved with 5%. These mixtures of hydrocarbon plastic and s-triazine derivative can be prepared by standard milling procedures in which the ingredients are compounded by mixing in a rubber mill or in a masticating mixer under conditions where the plastic is partially softened and stirred, or the s-triazine derivative may be coated on the plastic granules, as by spraying on solutions in volatile solvents, prior to extrusion of the plastic onto the solid substrate.

Another way of carrying out the process of the invention as indicated in FIGURE IV is to coat the solid substrate with a concentrated layer of the s-triazine derivative and then to contact the coated substrate with a molten, hydrocarbon plastic. This method of carrying out the process of the invention has the advantage of concentrating the adhesion promoter in the region of contact of hydrocarbon plastic with solid substrate. It is a most useful modification to employ when a relatively large proportion of hydrocarbon plastic is to be combined with the solid substrate since it then permits a considerable saving in the total amount of s-triazine derivative required.

The process of this invention may be carried out at any temperature above about 170° C. and below the point where thermal degradation of the hydrocarbon plastic becomes appreciable. Generally this operable range is from about 170° C. to about 300° C. while the preferred range is from about 180° C. to about 220° C.; above that temperature precautions must be taken to avoid excessive volatilization of the s-triazine derivative. The lower temperature limit is set by the apparently free-radical nature of the reaction involved. While it is not intended that this invention should be limited to any particular chemical mechanism, it is believed that a chemical reaction probably occurs between free-radicals, formed from the thermal treatment of the hydrocarbon plastic, and the s-triazine derivative. In the preferred temperature range, greater adhesion is obtained more rapidly at the higher temperature. Further evidence of the free-radical nature of the reaction is found in the fact that improved adhesion can be obtained rapidly at the lower end of the preferred temperature range by including in the hydrocarbon plastic a material, such as dicumyl peroxide, which forms free radicals rapidly at the reaction temperature. For this purpose, from 0.5% to about 5% by weight of dicumyl peroxide in the hydrocarbon plastic is effective.

It is obvious that in any adhesion process good contact is required. Therefore it is desirable to provide a solid substrate with a clean surface and to press the molten viscous hydrocarbon plastic against the surfaces of the substrate. The amount of pressure necessary to obtain this good contact depends both on the viscosity of the molten hydrocarbon plastic and on the shape and surface condition of the substrate; generally moderate pressures are sufficient. This polyethylene resin containing from 0.5% to 5% by weight of a s-triazine derivative of the class disclosed herein and about 2% dicumyl peroxide may be extruded as a molten film at about 170–210° C. onto the surface of a film of polyethylene terephthalate passing over a heated, smooth-surfaced cylindrical roll and the resultant laminate passed between the nip formed by the heated roll and a cool cylindrical roll which serves to press the polyethylene while still molten against the polyethylene terephthalate film and assure uniform contact of the two films. At high operational speeds, it is sometimes desirable to pass the laminated film over additional hot rolls to keep the laminate above 180° C. for a longer time so that the reactions producing adhesion will proceed to completion.

The following examples are illustrative of the invention herein described; it is not intended that the invention should be limited to the particular embodiments of these examples.

EXAMPLE 1

Portions of a polyethylene resin having an annealed density (20°/4°) of 0.923 and a melt index of 2.2 were mixed with 1%, 2.5% and 5% by weight, respectively, of triallyl cyanurate by milling at 160° C. for 10 minutes on a rubber mill. The products were sheeted out and cut up into molding granules. These polyethylene samples containing triallyl cyanurate were then compression molded into films in contact with hardened, 3 mil aluminum foil and with a polyethylene terephthalate film 1 mil thick. The procedure was to place the polyethylene between preformed sheets of aluminum or polyethylene terephthalate, respectively, in a preheated laboratory press and to press the materials together for 3 to 4 minutes; two temperatures, 180° C. and 210° C. were employed. Another portion of this polyethylene was mixed in the same fashion with 5% by weight of N,N-diallyl melamine. Laminates of this product with aluminum foil and with polyethylene terephthalate film were prepared following the procedure just described. As a control some polyethylene without these additives was similarly molded against aluminum and polyethylene terephthalate. The resulting laminates were tested for adhesion by measuring, on a standard tensile tester, the force, in pounds per inch, required to peel one-inch wide strips, cut from the laminated films, apart; this force is herein defined as the peel strength of the bond. The results are shown in Table 1.

*Table 1*

ADHESION OF POLYETHYLENE TO ALUMINUM FOIL AND TO POLYETHYLENE TEREPHTHALATE

| Test No. | Additive | Adhesion (lbs./inch) | | | |
|---|---|---|---|---|---|
| | | Aluminum Molded at | | Polyethylene Terephthalate, Molded at | |
| | | 180° C. | 210° C. | 180° C. | 210° C. |
| 1 | none—control | <0.5 | <0.5 | no adhesion. | no adhesion. |
| 2 | triallyl cyanurate, 1% | no adhesion. | no adhesion. | do | Do. |
| 3 | triallyl cyanurate, 2.5% | | 5.5 | do | 1.5. |
| 4 | triallyl cyanurate, 5% | | >10.0 | | 3.5. |
| 5 | N,N-diallyl melamine, 5% | 4.5 | 5.5 | 2.5 | 3.0. |

Thus with these additives, it is possible not only to obtain excellent adhesion between polyethylene and aluminum but also between polyethylene and polyethylene terephthalate. The adhesion obtained with polyethylene terephthalate is particularly surprising in view of the fact that polyallyl esters of carboxylic acids are ineffective for this purpose. Thus neither diallyl oxalate nor diallyl succinate, when milled into polyethylene at a concentration of 5% and molded against polyethylene terephthalate, produced any adhesion, although these additives did produce some adhesion of polyethylene to aluminum under the same conditions.

EXAMPLE 2

In these tests, the effect of an added free-radical source on the temperature required to attain good adhesion of polyethylene to a polar substrate was demonstrated. A branched polyethylene having a melt index of 1.7 was milled with 5% by weight of triallyl cyanurate, as described in Example 1. To a portion of this mixture 2% by weight of dicumyl peroxide was added and mixed by milling briefly. The samples each were then pressed against a polyethylene terephthalate film, and an aluminum foil, as described in Example 1, and the resultant adhesion measured by peel strength. The results are listed in Table 2.

Table 2
EFFECT OF PEROXIDE METERIAL IN PROMOTING ADHESION OF POLYETHYLENE CONTAINING TRIALLYL CYANURATE

| Test No. | Additive A—Triallyl Cyanurate, percent | Additive B—Dicumyl Peroxide, percent | Press Temp., °C. | Adhesion (lbs./inch) | |
|---|---|---|---|---|---|
| | | | | Aluminum | Polyethylene Terephthalate |
| 6 | 5 | 0 | 180 | <0.5 | <0.5 |
| 7 | 5 | 2 | 180 | 4.5 | 2.0 |
| 8 | 5 | 0 | 200 | 4.8 | 0.5 |
| 9 | 5 | 2 | 200 | 2 | 1.8 |
| 10 | 5 | 0 | 220 | 5.9 | 5.0 |

Comparison of tests No. 6 and 7 with 8 and 9 indicates that, particularly at 180° C. or below the presence of a free-radical source, in this case peroxide, reduces the temperature required to obtain adhesion between these materials, and particularly at the lower temperature, greatly promotes the degree of adhesion attained. The addition of only the peroxide to the resin does not provide the improved adhesion obtained with the additives disclosed herein.

EXAMPLE 3

Polyethylene resins having densities in the range of 0.91 to 0.93 and melt indices of 0.2 to 2.2 were milled with 5% by weight triallyl cyanurate and the resultant compositions were molded against polyethylene terephthalate at 220° C. yielding laminates having peel strength of from 2.6 to 5.0 lbs./inch. A polyethylene resin of similar density but having a much lower molecular weight (melt index of 20) was similarly mixed with 5% triallyl cyanurate and molded against polyethylene terephthalate film. There was no measurable adhesion between films of the resultant laminate. Hence low-density polyethylenes of melt index below about 10 are employed for the preparation of compositions of this invention, and those having melt indices below about 3 are preferred.

EXAMPLE 4

Two linear polyethylene resins, both having an annealed density of 0.95 but having melt indices of 0.36 and 20, respectively, were milled with 5% by weight of triallyl cyanurate and the resultant compositions molded against polyethylene terephthalate film and against aluminum foil as described in Example 1, operating the molding cycle at 220° C. The adhesions obtained, as measured by peel strength in pounds per inch, are shown in Table 3.

Table 3
ADHESION OF LINEAR POLYETHYLENE COMPOSITIONS CONTAINING 5% TRIALLYL CYANURATE—MOLDED AT 220° C.

| Test No. | Melt Index | Adhesion (lbs./inch) | |
|---|---|---|---|
| | | Aluminum | Polyethylene Terephthalate |
| 11 | 0.36 | 18. | 3.6 |
| 12 | 20 | 5.5 | 0.8 |

Controls without the triallyl cyanurate additive gave zero adhesion to polyethylene terephthalate and less than 2 lbs./inch to aluminum.

EXAMPLE 5

A polyethylene resin of density of 0.918 and melt index 1.8 was milled with 0.5% and 5% by weight of triallyl cyanurate. The resultant compositions, and a control, were molded against aluminum and brass foils and polyethylene terephthalate film at 220° C. The resultant laminates were cut into 1 inch wide strips and the force required to peel the laminates apart was qualitatively judged by hand tests; in some cases it was also measured quantitatively on a tensile testing machine. The results are shown in Table 4.

Table 4

| Test No. | Added Triallyl Cyanurate, Percent | Qualitative Adhesion | | | Quantitative Adhesion (lbs./inch) | |
|---|---|---|---|---|---|---|
| | | Aluminum | Brass | Polyethylene Terephthalate | Aluminum | Brass |
| 13 | 0 | Fair | Poor | Poor | 3.2 | 0 |
| 14 | 0.5 | Excellent | Fair | Fair to good | 7.7 | 4.6 |
| 15 | 5 | do | Good | Excellent | 6.8 | 5 |

EXAMPLE 6

A thin coating of triallyl cyanurate was wiped onto the surface of a thin aluminum sheet and onto the surface of a sheet of oriented polyethylene terephthalate. Partially crystalline polypropylene (melt index 0.2; 62% crystalline) was molded between these coated surfaces at 220° C.; the laminate was cooled in the press. It was tested for adhesion by qualitative determination of the peel strengths of the bonds between the polypropylene and the aluminum and polyethylene terephthalate sheets. It was found that the adhesion was markedly greater in both cases than was obtained with uncoated controls. The presence of certain antioxidants and low molecular weight "grease" in the polypropylene sometimes prevents the development of the good adhesion observed in these tests.

While for convenience in testing, this invention has been illustrated in the above examples by its application to laminated films, this invention is not limited to such laminated film. The novel compositions of this invention are useful for providing shaped articles of many forms with adherent coatings of hydrocarbon resins, and, as disclosed hereinabove, are particularly useful in the preparation of filled hydrocarbon resins. Thus polyethylene resins containing any of the additives of the class defined hereinabove can be milled with high loadings of finely-divided solids such as carbon blacks, silicas, asbestos, etc., to yield filled compositions of improved toughness and strength, superior in their physical properties to filled compositions made without the use of the s-triazine derivatives of the class defined herein.

Obviously, in addition to the s-triazine derivatives, other additives customarily used with hydrocarbon resins may be employed, such as colorants and certain antioxidants and thermal stabilizers, without departing from the scope of the invention. Excessive amounts of many common antioxidants may prevent the free-radical reaction from proceeding and hence prevent adhesion.

We claim:

1. A composition of matter useful for forming adherent coatings on polar solid substrates which comprises a thermoplastic high molecular weight polyolefin, obtained by the polymerization of 1-olefins selected from the group consisting of ethylene and homologous 1-olefins, having a melt index between about 0.1 and about 10 mixed with from 0.25 to 10% by weight of a s-triazine derivative selected from the class consisting of the polyallyl esters of cyanuric acid and the polyallyl melamines.

2. A composition of claim 1 wherein the s-triazine derivative is triallyl cyanurate.

3. A composition of claim 1 wherein the s-triazine derivative is N,N-diallyl melamine.

4. A composition of matter useful for forming adherent coatings on polar solid substrates which comprises a thermoplastic, high molecular weight polyolefin, obtained by the polymerization of 1-olefins selected from the group consisting of ethylene and homologous 1-olefins, having a melt index between about 0.1 and about 10, containing uniformly admixed therewith from 0.5 to 10% by weight of a s-triazine derivative selected from the class consisting of polyallyl esters of cyanuric acid and the polyallyl melamines, and from 0.5 to 5% by weight of a compound which decomposes to yield free radicals at a temperature between 170° and 220° C.

5. A composition of claim 4 wherein the compound which yields free radicals is dicumyl peroxide.

6. A composition of matter useful for forming adherent coatings on polar substrates which comprises a polyethylene resin having a melt index between about 0.1 and about 10 mixed with from 0.5 to 5% by weight of a s-triazine derivative selected from the class consisting of polyallyl esters of cyanuric acid and the polyallyl melamines.

7. A composition of claim 6 wherein the polyethylene resin is a branched polyethylene having an annealed density in the range of 0.91 to 0.93 and a melt index between about 0.1 and about 3.

8. A composition of claim 6 wherein the polyethylene resin is a linear polyethylene having an annealed density in the range of 0.95 to 0.97.

9. A process for adhering a thermoplastic high molecular weight polyolefin, obtained by the polymerization of 1-olefins selected from the group consisting of ethylene and homologous 1-olefins, to a polar, solid substrate which comprises contacting said solid substrate with said polyolefin in the molten state at a temperature from about 170° C. to about 300° C. in the presence of a s-triazine derivative selected from the class consisting of the polyallyl esters of cyanuric acid and the polyallyl melamines and subjecting the composition to pressure while the polyolefin is molten.

10. A process according to claim 9 wherein the s-triazine derivative is triallyl cyanurate.

11. A process according to claim 9 wherein the s-triazine derivative is N,N-diallyl melamine.

12. A process according to claim 9 wherein the polyolefin is partially crystalline polypropylene.

13. A process for coating a solid shaped article of a polar material with an adherent layer of a polyolefin resin selected from the class which consists of polyethylene, polymers of homologous 1-olefins, and copolymers of ethylene with homologous 1-olefins, which process comprises contacting said solid shaped article with said polyolefin resin in the molten state at a temperature between about 170° C. and about 300° C. in the presence of a s-triazine derivative selected from the class consisting of the polyallyl esters of cyanuric acid and the polyallyl melamines and in the presence of a compound which decomposes to yield free radicals at the reaction temperature and subjecting the coated article to pressure while the polyolefin resin is molten.

14. A process according to claim 13 wherein the shaped article is formed of polyethylene terephthalate.

15. A process according to claim 13 wherein the shaped article is formed of a metal.

16. A process according to claim 13 wherein the compound which decomposes to yield free radicals is dicumyl peroxide.

17. A process for coating a shaped article of polyethylene terephthalate with an adherent layer of a polyethylene resin which comprises contacting said shaped article of polyethylene terephthalate with said polyethylene resin in the molten state at a temperature between about 170° C. and about 300° C. in the presence of a s-triazine derivative selected from the class consisting of the polyallyl esters of cyanuric acid and the polyallyl melamines, and subjecting the coated article to pressure while the polyethylene is molten.

18. A process according to claim 17 wherein the shaped article is in the form of a film of polyethylene terephthalate.

19. A laminated film structure comprising a film of polyethylene terephthalate adhered with a bond peel strength of at least 1.5 pounds per inch to a film of polyethylene containing from 0.5% to 10% by weight of a s-triazine derivative selected from the class consisting of the polyallyl esters of cyanuric acid and the polyallyl melamines.

References Cited in the file of this patent

UNITED STATES PATENTS

| | | |
|---|---|---|
| 2,510,503 | Kropa | June 6, 1950 |
| 2,609,353 | Rubens | Sept. 2, 1952 |
| 2,622,056 | De Coudres et al. | Dec. 16, 1952 |
| 2,628,208 | Loukomsky | Feb. 10, 1953 |
| 2,707,177 | Skiff | Apr. 26, 1955 |
| 2,838,437 | Busse et al. | June 10, 1958 |
| 2,876,067 | Nagel et al. | May 3, 1959 |

OTHER REFERENCES

Bordon Co., "Monomer-Polymer Lab. Price List, Jan. 1, 1958," page 15.